(12) United States Patent
Salter et al.

(10) Patent No.: US 12,094,218 B2
(45) Date of Patent: Sep. 17, 2024

(54) SYSTEMS AND METHODS FOR DETECTING OBSTACLES IN THE PATHWAY OF CABLES

(71) Applicant: Ford Global Technologies, LLC, Dearborn, MI (US)

(72) Inventors: Stuart C. Salter, White Lake, MI (US); Vyas Shenoy, Canton, MI (US); David Celinske, Wolverine Lake, MI (US); Todd Ansbacher, Westland, MI (US); Paul Kenneth Dellock, Northville, MI (US); John Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 17/816,650

(22) Filed: Aug. 1, 2022

(65) Prior Publication Data
US 2024/0034171 A1    Feb. 1, 2024

(51) Int. Cl.
*B60L 55/00*  (2019.01)
*G06V 20/58*  (2022.01)
(Continued)

(52) U.S. Cl.
CPC ............. *G06V 20/58* (2022.01); *B60L 55/00* (2019.02); *H02G 1/06* (2013.01); *H02G 9/02* (2013.01)

(58) Field of Classification Search
CPC .......... G06V 20/58; B60L 55/00; H02G 1/06; H02G 9/02
See application file for complete search history.

(56) References Cited

U.S. PATENT DOCUMENTS 9,466,999 B2  10/2016  Ishii et al.
10,745,013 B1  8/2020  Herhusky et al.
(Continued)

FOREIGN PATENT DOCUMENTS

CN  117498207 A  *  2/2024  .............. B60L 53/18
DE  102020108795 A1  10/2020

OTHER PUBLICATIONS

Tiande Mo et al., Commercialization of Electric Vehicles in Hong Kong, Energies 2022, 15, 945, Jan. 27, 2022, 1-27.
(Continued)

*Primary Examiner* — Frederick L Lagman
(74) *Attorney, Agent, or Firm* — Frank Lollo; Eversheds Sutherland (US) LLP

(57) ABSTRACT

The disclosure generally pertains to systems and methods for detecting obstacles in the pathway of cables. In an example method, a first location at a site for stationing a vehicle may be selected. A first routing for a cable may then be determined, where a first end of the cable is connected to the vehicle stationed at the first location. It may then be determined at the vehicle whether the first routing for the cable passes through at least one potential or actual obstacle, where the determination is based at least in part on a topographic map. Responsive to the determination that the first routing for the cable passes through the at least one potential or actual obstacle, a remedial action may be performed, where the remedial action prevents the first routing of the cable from passing through the at least one potential or actual obstacle.

20 Claims, 4 Drawing Sheets

(51) Int. Cl.
*H02G 1/06* (2006.01)
*H02G 9/02* (2006.01)

(56) References Cited

U.S. PATENT DOCUMENTS

| | | | |
|---|---|---|---|
| 10,933,750 | B2 * | 3/2021 | Jun .......................... B60L 58/12 |
| 11,964,585 | B2 * | 4/2024 | Oh ......................... B60R 25/241 |
| 2019/0283731 | A1 * | 9/2019 | Mazaira .............. B60W 50/085 |
| 2020/0231063 | A1 * | 7/2020 | Sadano ................... H02J 3/144 |
| 2021/0053460 | A1 | 2/2021 | Oh et al. |

OTHER PUBLICATIONS

Joe Wiesenfelder, We charged a Ford Mustang Mach-E With an F-150, Jan. 13, 2022, 1-15.

\* cited by examiner

SYSTEMS AND METHODS FOR DETECTING OBSTACLES IN THE PATHWAY OF CABLES

BACKGROUND

Vehicles may be used to supply power to equipment at various locations, for example, a construction site. In order to power such equipment, a cable may be connected from a power supply on board the vehicle to the equipment that is being powered. When such a cable is in use, it may be desirable for the vehicle to be configured to detect potential obstacles that are in the pathway of the cable in order to prevent the obstacles in the pathway of the cable from coming into contact with the cable.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
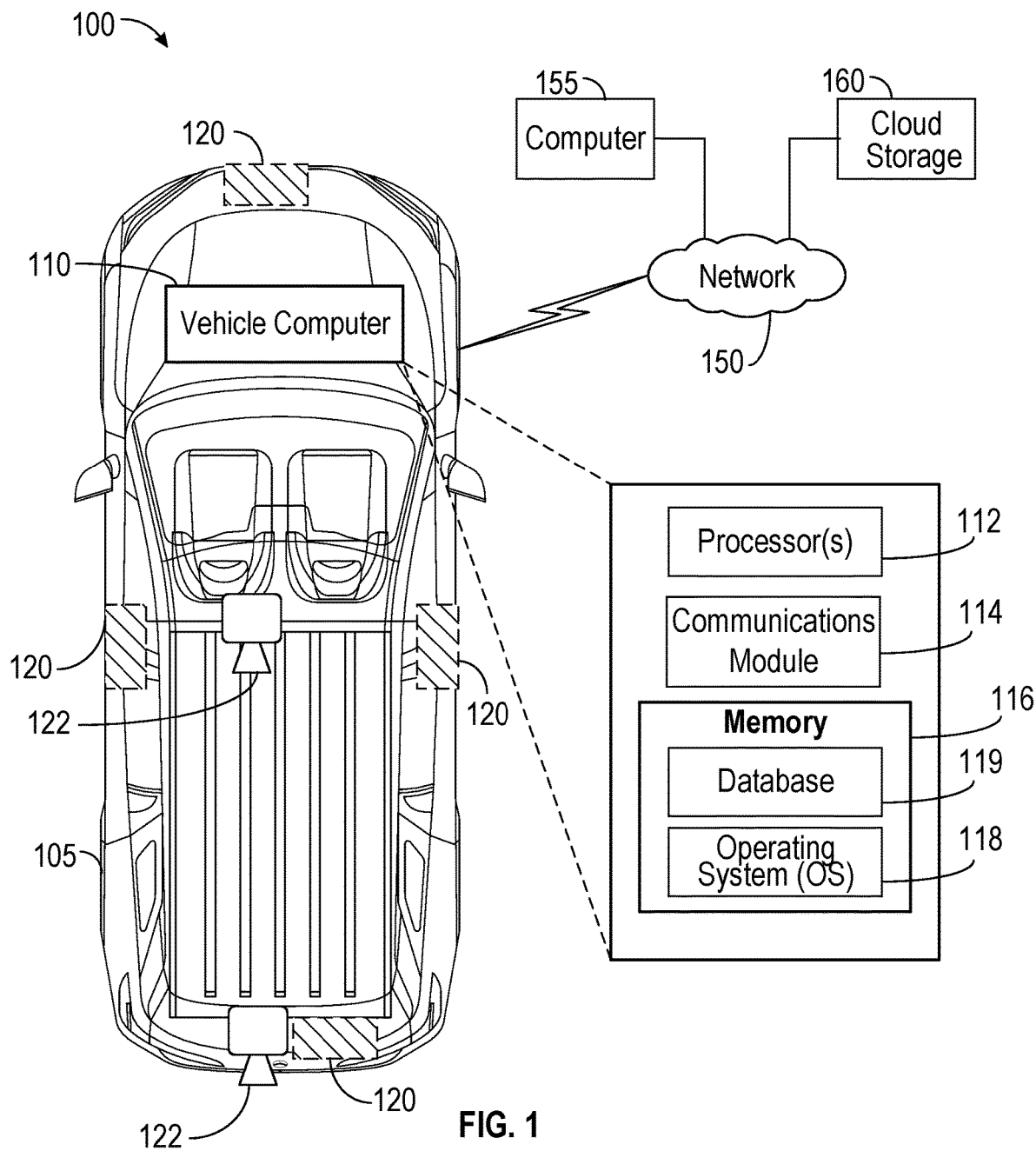
FIG. 1 illustrates an example system for detecting obstacles in the pathway of cables in accordance with an embodiment of the disclosure.

In terms of a general overview, certain embodiments described in this disclosure are directed to systems and methods for detecting obstacles in the pathway of cables. In an example method, a first location at a site for stationing a vehicle may be selected. A first routing for a cable may then be determined, where a first end of the cable is connected to the vehicle stationed at the first location. It may then be determined at the vehicle whether the first routing for the cable passes through at least one potential or actual obstacle, where the determination is based at least in part on a topographic map. Responsive to the determination that the first routing for the cable passes through the at least one potential or actual obstacle, a remedial action may be performed, where the remedial action prevents the first routing of the cable from passing through the at least one potential or actual obstacle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "vehicle driver" may be used interchangeably with the phrase "vehicle owner," the word "user," and the word "driver." Either word as used herein refers to any individual that is utilizing a vehicle with a cable connected to it. The word "device" may be any of various devices, such as, for example, a user device such as a smartphone or a tablet, a smart vehicle, and a computer. The word "sensor" may be any of various sensors that can be found in a vehicle, such as cameras, radar sensors, Lidar sensors, and sound sensors.

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

FIG. 1 illustrates an example system 100 for detecting obstacles in the pathway of cables in accordance with an embodiment of the disclosure. The system 100 may be carried out by a vehicle 105, which may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, a bus, or a trailer. The system 100 may be used to detect obstacles in the vicinity of a power cable, where the power cable may be connected to the vehicle 105.

The vehicle 105 may further include components such as, for example, a vehicle computer 110. The vehicle 105 may further include various types of sensors and detectors configured to provide various functionalities. For example, as depicted in FIG. 1, the vehicle 105 may include radar sensors 120 on each side of the vehicle and at least one camera 122. The vehicle computer 110 may perform various operations associated with the vehicle 105, such as controlling engine operations like turning the vehicle 105 on and off, fuel injection, speed control, emissions control, braking, and other engine operations.

In some embodiments, the vehicle computer 110 may include a processor 112, a communications module 114, and a memory 116. It must be understood that the communications module 114 is a functional block that can be implemented in hardware, software, or a combination thereof. An example hardware component may include a signal processor. An example software component may include a signal processing module. The processor 112 may carry out various operations by executing computer-readable instructions stored in the memory 116. The memory 116, which is one example of a non-transitory computer-readable medium, may be used to store a database 119 for storing data and an operating system (OS) 118.

In some embodiments, the vehicle computer 110 may be configured to include various components having functions associated with providing the system 100. For example, the vehicle computer 110 may assist in determining a trajectory of the power cable and then determining obstacles in the vicinity of the power cable. In an example embodiment, the vehicle computer 110 may be communicatively coupled to other components of the vehicle 105 via wired and/or wireless connections. More particularly, the vehicle computer 110 may be communicatively coupled to the vehicle 105 via a vehicle bus that uses a controller area network (CAN) bus protocol, a Media Oriented Systems Transport (MOST) bus protocol, and/or a CAN flexible data (CAN-FD) bus protocol. In another embodiment, the communications may be provided via wireless technologies such as Bluetooth®, Ultra-Wideband (UWB), cellular, Wi-Fi, ZigBee®, or near-field communications (NFC).

In some embodiments, the vehicle computer 110 is configured to communicate via a network 150 with devices located outside the vehicle 105, such as, for example, a computer 155 (a server computer, a cloud computer, etc.) and/or cloud storage 160.

The network 150 may include any one, or a combination of networks, such as, for example, a local area network (LAN), a wide area network (WAN), a telephone network, a cellular network, a cable network, a wireless network, and/or private/public networks such as the Internet. The network 150 may support any of various communications technologies, such as, for example, TCP/IP, Bluetooth®, near-field communication (NFC), Wi-Fi, Wi-Fi Direct, Ultra-Wideband (UWB), cellular, machine-to-machine communication, and/or man-to-machine communication.

Figure 2:
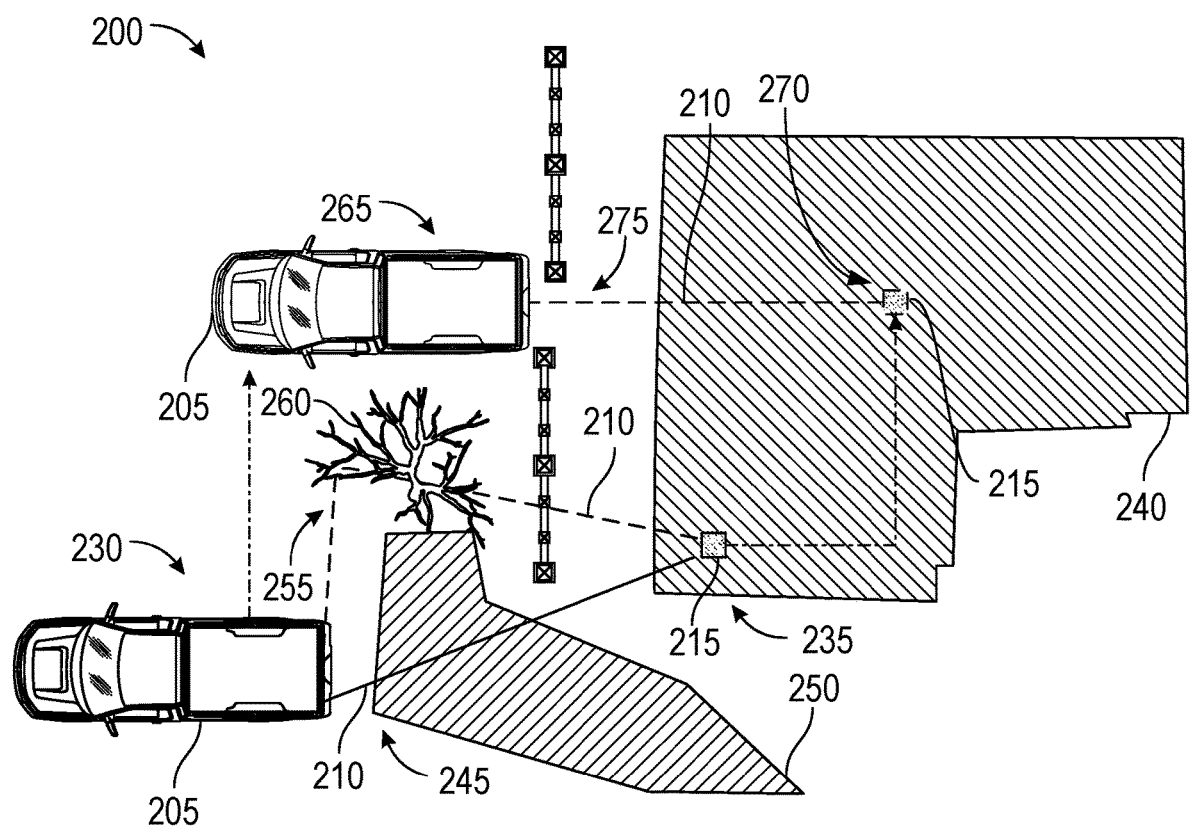
FIG. 2 illustrates an example implementation of a system for detecting obstacles in the pathway of cables in accordance with an embodiment of the disclosure.

FIG. 2 illustrates an example implementation of a system 200 for detecting obstacles in the pathway of a cable in accordance with an embodiment of the disclosure. The system 200 may involve a vehicle 205. In one example, as depicted in FIG. 2, the vehicle 205 may be a truck having a truck bed. The truck may be located at a particular location on a construction site or other location. In such an example, a cable 210 may be connected to the vehicle 205 via a power source in the truck bed. It should be noted that the cable 210 may be connected to any appropriate power source in the vehicle 205. The cable 210 being extended from the vehicle 205 may include the cable 210 being connected at a distal second end to equipment that is external to the vehicle 205. In one example, the cable 210 may be further connected to a distribution box 215. In other examples, the cable 210 may be further connected to any other electrical equipment.

In some embodiments, radar sensors at the vehicle 205 may be used to create a topographical map of the area where the vehicle 205 is located. The topographical map may be generated as the vehicle 205 drives around the area. In some embodiments, the topographical map may be created relative from a single location, for example, the vehicle's 205 location. In other embodiments, the topographical map may be created relative from multiple locations using a real-time kinematic (RTK) beacon. In such embodiments, the RTK beacon may assist the vehicle 205 in determining its own location. In yet other embodiments, the topographical map may be created relative from an absolute location using a RTK beacon. In some embodiments, other sensors at the vehicle 205 may assist in creating the topographical map. For example, an accelerometer in the vehicle 205 may be used to determine a pitch and/or a roll of the vehicle 205 while the vehicle 205 is driving around the area in order to determine a relative height mapping for the topographical map. In some instances, a telematics control unit (TCU) may be used in combination with the accelerometer and/or other sensors of the vehicle 205 to assist in the creation of the topographical map. In some embodiments, cameras at the vehicle 205 may be used to validate the topographical map generated by the radar sensors.

In other embodiments, the vehicle 205 may be configured to retrieve a topographical map of the area from a remote server, such as from other map-providing services that may generate topographical maps of the area using, for example, satellites and/or drones.

In some embodiments, the vehicle 205 may be configured to determine a routing for the cable 210. The vehicle 205 may consider a routing for the cable 210 in a straight line from the vehicle 205 to the distribution box 215. The vehicle 205 may then evaluate if such a routing avoids potential and/or actual obstacles or if such a routing passes through any potential and/or actual obstacles. The vehicle 205 may perform this evaluation based on the topographical map. The potential and/or actual obstacles may include low spots (which may allow standing water to accumulate), wet spots, moist spots, trees, fences, and/or any other potential and/or actual obstacles that may be in the pathway of the cable 210. In some embodiments, the potential and/or actual obstacles may be identified using infrared cameras and/or near-infrared cameras. For example, infrared cameras and/or near-infrared cameras may be capable of detecting if the cable 210 is wet or submerged under water based on a reduced thermal map.

In some embodiments, if the distribution box 215 is located in the interior of a building or other facility, the vehicle 205 may be further configured to evaluate if such a routing allows the cable 210 to reach an approximate center of the building or other facility given the distance between the vehicle 205 and the approximate center of the building or other facility and the size of the building or other facility. In some embodiments, the vehicle 205 may be further configured to determine if the cable 210 has a length that exceeds the distance between the vehicle 205 and the approximate center of the building or other facility in order to account for routing within the building, which may not be in a straight line due to obstacles such as doors, walls, and/or other obstacles.

In other embodiments, if the distribution box 215 is located in an exterior environment that is not within a structure, the vehicle 205 may be configured to determine weather conditions in the area and notify an operator of the vehicle 205 of the weather conditions. Weather conditions may include whether precipitation is occurring and whether precipitation is likely to occur while the distribution box 215 is located in the exterior environment. In one example, the vehicle 205 may be configured to receive a current weather and/or a predicted weather forecast for the area via an application at the vehicle or via a device associated with a vehicle operator. In another example, the vehicle 205 may be configured to receive a current weather and/or a predicted weather forecast via radar predictions. In yet another example, the vehicle 205 may be configured to detect the presence of precipitation via cameras at the vehicle. In another example, the vehicle 205 may be configured to use a rain sensing wiper sensor to determine if precipitation is occurring. In yet another example, vehicle passive entry passive start (PEPS) capacitive sensors may be used to determine if precipitation is occurring. In such an example, the vehicle 205 may be capable of detecting the presence of precipitation even when the vehicle 205 is turned off. In some embodiments, if precipitation is detected and/or forecasted, the vehicle 205 may be configured to notify a vehicle operator of particular weather conditions through audible alerts at the vehicle 205, flashing lights at the vehicle 205, Bluetooth® or other wireless communications to a user interface at the vehicle 205 or a device associated with the vehicle operator, an application associated with the user interface at the vehicle 205 or the device associated with the vehicle operator, and/or other methods of notification.

In some embodiments, the vehicle 205 may determine particular subareas within the construction site or other location to avoid based on the topographical map. The vehicle 205 may be further configured to map out preferable camping spaces based on the topographical map. For example, the vehicle 205 may be capable of detecting subareas of a lower height, which may be less preferable to campers in case of rain. In some embodiments, the vehicle 205 may be further configured to evaluate a finished grade of a surface on the construction site or other location by evaluating a slope and/or evenness of the surface based on the topological map.

In some embodiments, if the vehicle 205 determines that the routing of the cable 210 may pass through at least one potential and/or actual obstacle, a remedial action may be recommended by the vehicle 205. For example, the vehicle 205 may recommend an alternative routing of the cable 210 such that any potential and/or actual obstacles are avoided in the pathway of the alternative routing. The vehicle 205 may alternatively recommend the repositioning of the vehicle 205 to a different location to avoid any potential and/or actual obstacles. The vehicle 205 may also recommend the repositioning of the vehicle 205 in order to reduce a length of the cable 210 necessary to connect the vehicle 205 to the distribution box 215. The vehicle 205 may alternatively recommend the use of stakes or other supports in order to elevate the cable 210 above the potential and/or actual obstacles if there are a limited number of potential and/or actual obstacles along the routing. For example, if the only potential and/or actual obstacles in the pathway of the routing are two wet spots, the vehicle 205 may opt to recommend that the cable 210 be elevated above the ground surface around the two wet spots using stakes or other supports, instead of finding an alternative routing for the cable 210 or repositioning the vehicle 205.

For example, as depicted in FIG. 2, the vehicle 205 may be located at a first vehicle location 230 at a construction site. Based on a first distribution box location 235 of the distribution box 215 (where the first distribution box location 235 is inside a building 240), the vehicle 205 may then determine a first routing 245 to connect the cable 210 from the vehicle 205 to the distribution box 215. The first routing 245 may be a straight line. If the vehicle 205 determines that the first routing 245 passes through at least one potential and/or actual obstacle, such as a low and/or damp spot 250, the first routing 245 may not be preferable. As such, the vehicle 205 may recommend a remedial action that involves a second routing 255 to connect the cable 210 from the vehicle 205 to the distribution box 215. For example, as depicted in FIG. 2, the second routing 255 may avoid the low and/or damp spot 250. However, the second routing 255 may pass through another potential and/or actual obstacle 260, for example, a tree. If the vehicle 205 and the distribution box 215 should remain in their existing locations for any reason, the second routing 255 may be preferred regardless of the presence of the another potential and/or actual obstacle 260. However, if the vehicle 205 and the distribution box 215 may be moved from their existing locations, the vehicle 205 may recommend another remedial action. The vehicle 205 may further determine that the first routing 245 and the second routing 255 do not allow the distribution box 215 to be located at a center of the building 240. The vehicle 205 may thus recommend the repositioning of the vehicle 205 from the first vehicle location 230 to a second vehicle location 265 and the repositioning of the distribution box 215 from the first distribution box location 235 to a second distribution box location 270. A third routing 275 may then be determined to connect the vehicle 205 to the distribution box 215. As depicted in FIG. 2, a benefit of the third routing 275 may be the ability to locate the distribution box 215 proximate to a center of the building 240, the absence of any potential and/or actual obstacles along the pathway of the cable 210, and a reduced exposed length of the cable 210.

Figure 3:
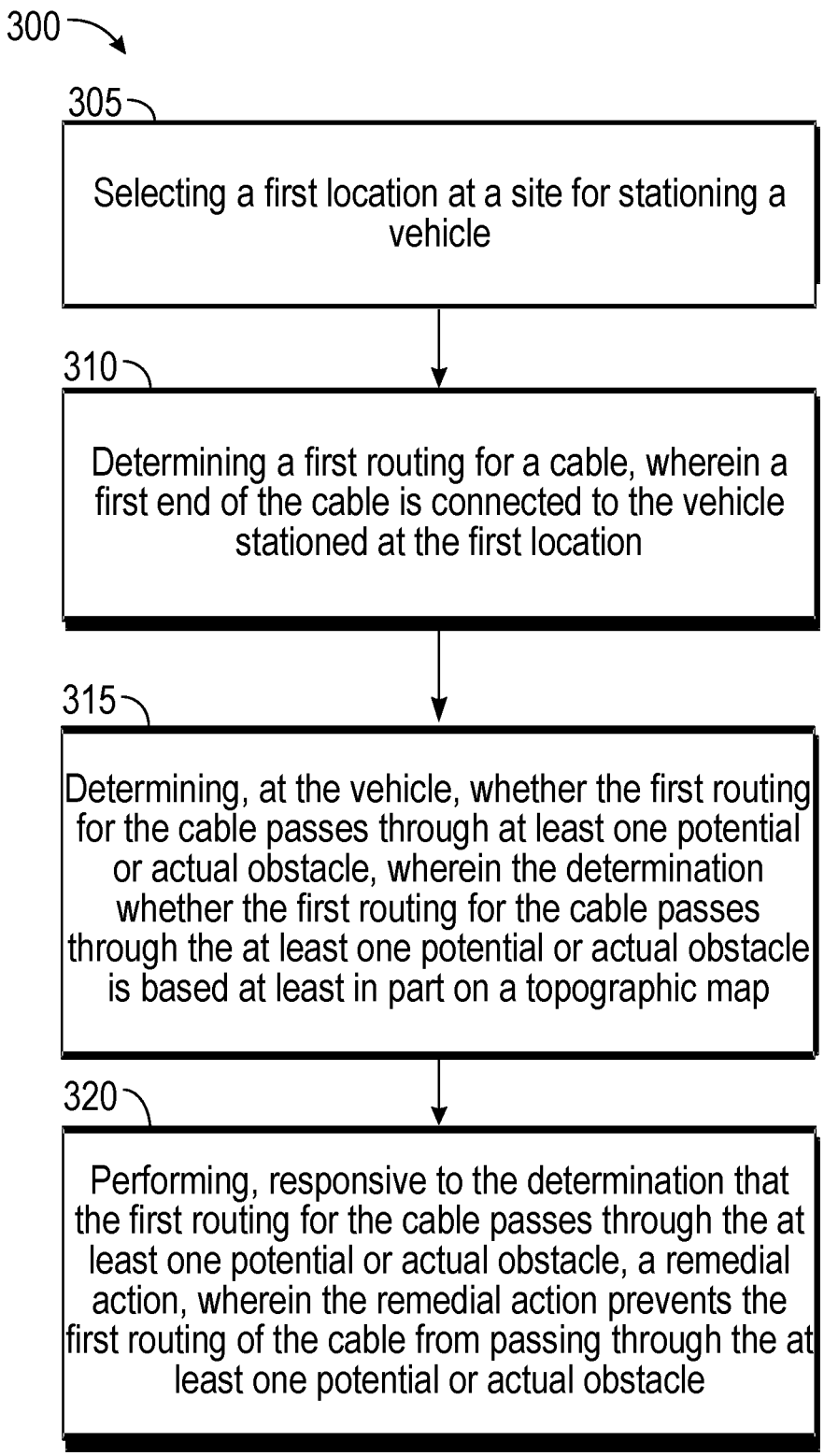
FIG. 3 depicts a flow chart of an example method for detecting obstacles in the pathway of cables in accordance with the disclosure.

FIG. 3 shows a flow chart 300 of an example method of detecting obstacles in the pathway of cables in accordance with the disclosure. The flow chart 300 illustrates a sequence of operations that can be implemented in hardware, software, or a combination thereof. In the context of software, the operations represent computer-executable instructions stored on one or more non-transitory computer-readable media such as a memory 116 provided in the vehicle computer 110, that, when executed by one or more processors such as the processor 112 provided in the vehicle computer 110, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 300 may be carried out by the vehicle computer 110 either independently or in cooperation with other devices such as, for example, other components of the vehicle 105 and cloud elements (such as, for example, the computer 155 and cloud storage 160.

At block 305, a first location at a site for stationing a vehicle may be selected.

At block 310, a first routing for a cable may be determined. A first end of the cable is connected to the vehicle stationed at the first location.

At block 315, it may be determined, at the vehicle, whether the first routing for the cable passes through at least one potential or actual obstacle. The determination whether the first routing for the cable passes through the at least one potential or actual obstacle may be based at least in part on a topographic map. In some embodiments, the topographic map may be generated by the vehicle as the vehicle drives around the site or is received at the vehicle from a remote server.

At block 320, responsive to the determination that the first routing for the cable passes through the at least one potential or actual obstacle, a remedial action may be performed. The remedial action may prevent the first routing of the cable from passing through the at least one potential or actual obstacle. In some embodiments, the remedial action may be at least one of determining a second routing for the cable, selecting a second location at the site for stationing the vehicle, or implementing at least one support to elevate the cable from a ground surface at the at least one potential or actual obstacle. In some embodiments, the second routing of the cable may not pass through any potential or actual obstacles at the site.

In some embodiments, the at least one potential or active obstacle may be identified via at least one infrared camera or at least one near-infrared camera.

In some embodiments, it may be determined whether a distribution box is configured to be disposed at an exterior environment at the site. In some embodiments, responsive to the determination that the distribution box is configured to be disposed at the exterior environment at the site, it may be determined whether precipitation is occurring at the site. In some embodiments, the determination of whether precipitation is occurring at the site may be at least one of detecting a presence of the precipitation via at least one rain sensing wiper sensor, detecting the presence of the precipitation via at least one passive entry passive start (PEPS) capacitive sensor, receiving a prediction of the precipitation via an application at the vehicle, receiving the prediction of the precipitation via radar predictions, and/or detecting the presence of the precipitation via at least one vehicle camera.

Figure 4:
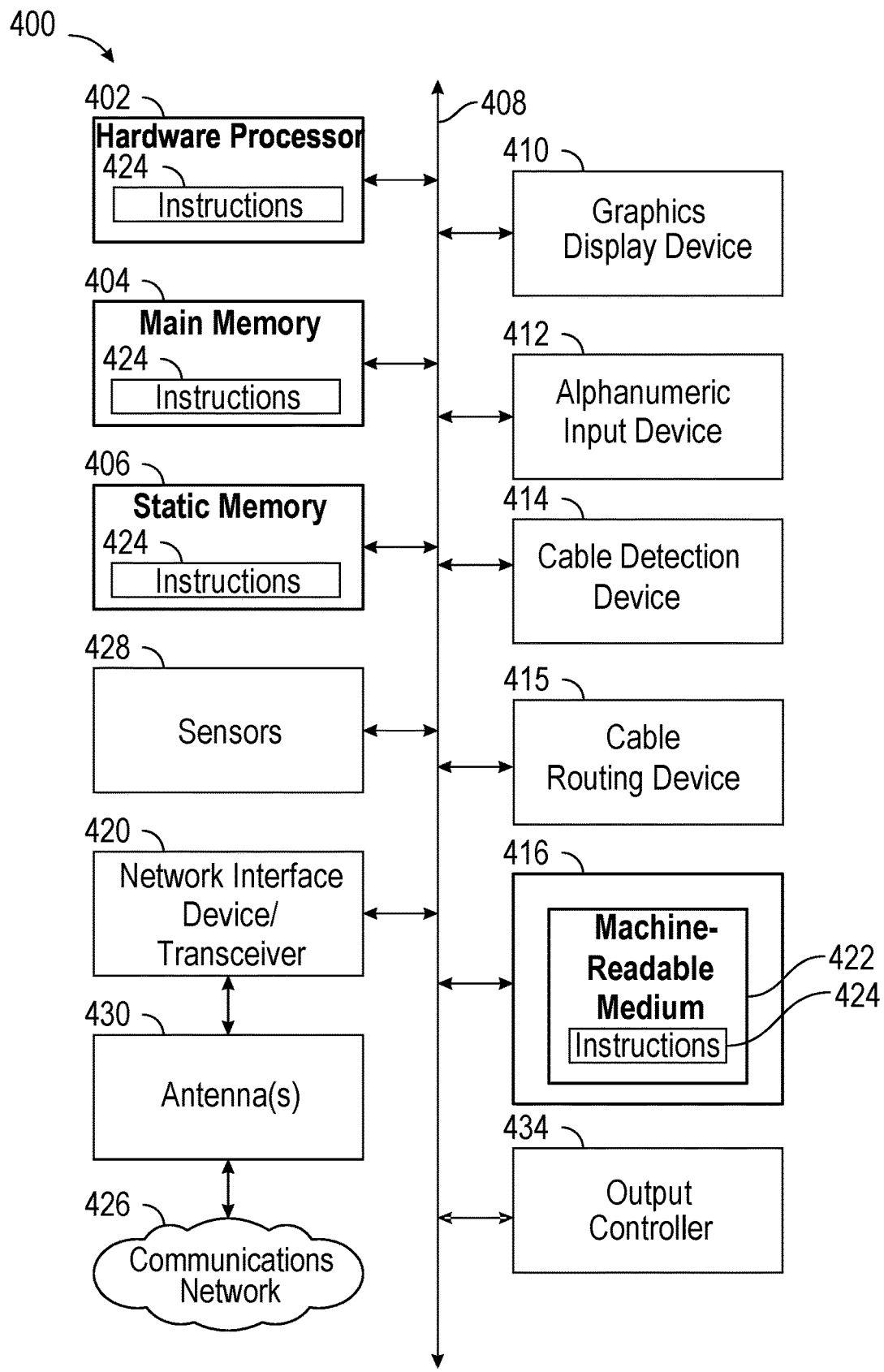
FIG. 4 depicts a block diagram of an example machine upon which any of one or more techniques (e.g., methods) may be performed, in accordance with an embodiment of the disclosure.

FIG. 4 depicts a block diagram of an example machine 400 upon which any of one or more techniques (e.g., methods) may be performed, in accordance with one or more example embodiments of the present disclosure. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. In some embodiments, the machine 400 may be the vehicle 105, as depicted in FIG. 1. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a graphics display device 410, an alphanumeric input device 412 (e.g., a keyboard), a cable detection device 414, and a cable routing device 415. In an example, the graphics display device 410, the alphanumeric input device 412, the cable detection device 414, and the cable routing device 415 may be a touch screen display. The machine 400 may additionally include a storage device (i.e., drive unit) 416, a network interface device/transceiver 420 coupled to antenna(s) 430, and one or more sensors 428, such as a global positioning system (GPS) sensor, a compass, an accelerometer, or other sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 416 may include a machine-readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 112, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 116, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   selecting a first location at a site for stationing a vehicle;
   determining a first routing for a cable, wherein a first end of the cable is connected to the vehicle stationed at the first location;
   determining, at the vehicle, whether the first routing for the cable passes through at least one potential or actual obstacle, wherein the determination whether the first routing for the cable passes through the at least one potential or actual obstacle is based at least in part on a topographic map; and
   performing, responsive to the determination that the first routing for the cable passes through the at least one potential or actual obstacle, a remedial action, wherein the remedial action prevents the first routing of the cable from passing through the at least one potential or actual obstacle.

2. The method of claim 1, wherein the remedial action comprises at least one of: determining a second routing for the cable, selecting a second location at the site for stationing the vehicle, or implementing at least one support to elevate the cable from a ground surface at the at least one potential or actual obstacle.

3. The method of claim 2, wherein the second routing of the cable does not pass through any potential or actual obstacles at the site.

4. The method of claim 1, wherein the topographic map is generated by the vehicle as the vehicle drives around the site or is received at the vehicle from a remote server.

5. The method of claim 1, further comprising:
   identifying, via at least one infrared camera or at least one near-infrared camera, the at least one potential or active obstacle.

6. The method of claim 1, further comprising:
   determining whether a distribution box is configured to be disposed at an exterior environment at the site; and
   determining, responsive to the determination that the distribution box is configured to be disposed at the exterior environment at the site, whether precipitation is occurring at the site.

7. The method of claim 6, wherein the determination of whether precipitation is occurring at the site further comprises at least one of:
   detecting, via at least one rain sensing wiper sensor, a presence of the precipitation;
   detecting, via at least one passive entry passive start (PEPS) capacitive sensor, the presence of the precipitation;
   receiving, via an application at the vehicle, a prediction of the precipitation;
   receiving, via radar predictions, the prediction of the precipitation; and
   detecting, via at least one vehicle camera, the presence of the precipitation.

8. A device, comprising:
   at least one memory device that stores computer-executable instructions; and
   at least one processor configured to access the at least one memory device, wherein the at least one processor is configured to execute the computer-executable instructions to:
   select a first location at a site for stationing a vehicle;
   determine a first routing for a cable, wherein a first end of the cable is connected to the vehicle stationed at the first location;
   determine, at the vehicle, whether the first routing for the cable passes through at least one potential or actual obstacle, wherein the determination whether the first routing for the cable passes through the at least one potential or actual obstacle is based at least in part on a topographic map; and
   perform, responsive to the determination that the first routing for the cable passes through the at least one potential or actual obstacle, a remedial action, wherein the remedial action prevents the first routing of the cable from passing through the at least one potential or actual obstacle.

9. The device of claim 8, wherein the remedial action comprises at least one of: determining a second routing for the cable, selecting a second location at the site for stationing the vehicle, or implementing at least one support to elevate the cable from a ground surface at the at least one potential or actual obstacle.

10. The device of claim 9, wherein the second routing of the cable does not pass through any potential or actual obstacles at the site.

11. The device of claim 8, wherein the topographic map is generated by the vehicle as the vehicle drives around the site or is received at the vehicle from a remote server.

12. The device of claim 8, wherein the at least one processor is further configured to execute the computer-executable instructions to:
    identify, via at least one infrared camera or at least one near-infrared camera, the at least one potential or active obstacle.

13. The device of claim 8, wherein the at least one processor is further configured to execute the computer-executable instructions to:
    determine whether a distribution box is configured to be disposed at an exterior environment at the site; and
    determine, responsive to the determination that the distribution box is configured to be disposed at the exterior environment at the site, whether precipitation is occurring at the site.

14. The device of claim 13, wherein the determination of whether precipitation is occurring at the site further comprises at least one of:
    detect, via at least one rain sensing wiper sensor, a presence of the precipitation;
    detect, via at least one passive entry passive start (PEPS) capacitive sensor, the presence of the precipitation;
    receive, via an application at the vehicle, a prediction of the precipitation;
    receive, via radar predictions, the prediction of the precipitation; and
    detect, via at least one vehicle camera, the presence of the precipitation.

15. A non-transitory computer-readable medium storing computer-executable instructions which, when executed by a processor, cause the processor to perform operations comprising:
    selecting a first location at a site for stationing a vehicle;
    determining a first routing for a cable, wherein a first end of the cable is connected to the vehicle stationed at the first location;
    determining, at the vehicle, whether the first routing for the cable passes through at least one potential or actual obstacle, wherein the determination whether the first routing for the cable passes through the at least one potential or actual obstacle is based at least in part on a topographic map; and performing, responsive to the determination that the first routing for the cable passes through the at least one potential or actual obstacle, a remedial action, wherein the remedial action prevents the first routing of the cable from passing through the at least one potential or actual obstacle.

16. The non-transitory computer-readable medium of claim 15, wherein the remedial action comprises at least one of: determining a second routing for the cable, selecting a second location at the site for stationing the vehicle, or implementing at least one support to elevate the cable from a ground surface at the at least one potential or actual obstacle.

17. The non-transitory computer-readable medium of claim 16, wherein the second routing of the cable does not pass through any potential or actual obstacles at the site.

18. The non-transitory computer-readable medium of claim 15, wherein the topographic map is generated by the vehicle as the vehicle drives around the site or is received at the vehicle from a remote server.

19. The non-transitory computer-readable medium of claim 15, wherein the operations further comprise:
 identifying, via at least one infrared camera or at least one near-infrared camera, the at least one potential or active obstacle.

20. The non-transitory computer-readable medium of claim 15, wherein the operations further comprise:
 determining whether a distribution box is configured to be disposed at an exterior environment at the site; and
 determining, responsive to the determination that the distribution box is configured to be disposed at the exterior environment at the site, whether precipitation is occurring at the site.

* * * * *